US011640531B2

(12) United States Patent
Huang et al.

(10) Patent No.: US 11,640,531 B2
(45) Date of Patent: May 2, 2023

(54) METHOD, APPARATUS AND DEVICE FOR UPDATING CONVOLUTIONAL NEURAL NETWORK USING GPU CLUSTER

(71) Applicant: Advanced New Technologies Co., Ltd., Grand Cayman (KY)

(72) Inventors: Qiyin Huang, Hangzhou (CN); Yongchao Liu, Hangzhou (CN); Haitao Zhang, Hangzhou (CN); Chengping Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/322,626

(22) Filed: May 17, 2021

(65) Prior Publication Data

US 2021/0271976 A1 Sep. 2, 2021

Related U.S. Application Data

(63) Continuation of application No. PCT/CN2020/070253, filed on Jan. 3, 2020.

(30) Foreign Application Priority Data

Feb. 13, 2019 (CN) .......................... 201910116468.X

(51) Int. Cl.
*G06N 3/08* (2023.01)
*G06N 3/04* (2023.01)

(52) U.S. Cl.
CPC .................. *G06N 3/08* (2013.01); *G06N 3/04* (2013.01)

(58) Field of Classification Search
CPC .......... G06V 10/76; G06V 10/26; G06K 9/62; G01N 35/00; G01N 35/04
See application file for complete search history.

(56) References Cited

U.S. PATENT DOCUMENTS

| 6,819,790 B2* | 11/2004 | Suzuki | .................. G06T 7/0012 |
| | | | 382/130 |
| 2007/0047802 A1* | 3/2007 | Puri | ....................... G06N 3/084 |
| | | | 382/157 |

(Continued)

FOREIGN PATENT DOCUMENTS

| CN | 101253493 A | 8/2008 |
| CN | 104463324 A | 3/2015 |

(Continued)

OTHER PUBLICATIONS

'An Introduction to Convolutional Neural Networks' OShea, 2015.*

(Continued)

*Primary Examiner* — Michael J Huntley
*Assistant Examiner* — Peter D Coughlan
(74) *Attorney, Agent, or Firm* — Seed IP Law Group LLP

(57) ABSTRACT

An example method for updating convolutional neural network includes: obtaining a sample with a classification label; performing a first operation on the sample based on parameters of each layer of front-end network, to obtain a first operation result; performing a second operation on the sample based on the first operation result and the parameters of each layer of back-end network that the first GPU has, to obtain a second operation result; separately sending the first operation result to the other GPUs; receiving a third operation result obtained after each other GPU performs a third operation on the sample based on their parameters of each layer of back-end network and the first operation result; combining the second and third operation results to obtain a classification result; determining a prediction error based on the classification result and the classification label; and updating the convolutional neural network based on the prediction error.

13 Claims, 8 Drawing Sheets

(56) References Cited

U.S. PATENT DOCUMENTS

| | | | |
|---|---|---|---|
| 2017/0024849 A1* | 1/2017 | Liu | G06T 1/20 |
| 2017/0148433 A1 | 5/2017 | Catanzaro et al. | |
| 2017/0185895 A1 | 6/2017 | Chen et al. | |
| 2018/0032865 A1* | 2/2018 | Nishimura | G06N 3/04 |
| 2018/0121806 A1* | 5/2018 | Haruki | G06N 3/0454 |
| 2018/0129911 A1* | 5/2018 | Madabhushi | G06K 9/2054 |
| 2018/0341871 A1* | 11/2018 | Maitra | G06N 3/0427 |
| 2020/0265263 A1* | 8/2020 | Kluckner | G06V 10/764 |

FOREIGN PATENT DOCUMENTS

| | | |
|---|---|---|
| CN | 105894087 A | 8/2016 |
| CN | 106339753 A | 1/2017 |
| CN | 107292385 A | 10/2017 |
| CN | 108021395 A | 5/2018 |
| CN | 108108813 A | 6/2018 |
| CN | 108229687 A | 6/2018 |
| CN | 108304918 A | 7/2018 |
| CN | 108460457 A | 8/2018 |
| CN | 109241139 A | 1/2019 |
| CN | 110059813 A | 7/2019 |
| WO | 2015/192812 A1 | 12/2015 |

OTHER PUBLICATIONS

Yang et al., "Training Framework of Multi-GPU Deep Neural Network Based on Virtualization," Computer Engineering, 44(2):68-74, 83, 2018,.

Xue et al., "Fast Training Algorithm for Deep Neural Network Using Multiple GPUs," J.Tsinghua Univ (Sci & Tech), 53(6):745-748, 2013.

Rekabdar et al., "Using Patterns of Firing Neurons in Spiking Neural Networks for Learning and Early Recognition of Spatio-Temporal Patterns," *Neural Comput & Applic 28*, 881-897, 2016.

Zhang et al., "Multi-GPU Based Recurrent Neural Network Language Model Training," *ICYCSEE 2076*, p. 484-493, 2016.

Wang, "Natural Image Classification Method Based on the Deep Learning Research," Master's thesis, East China University of Technology, 1-55, 2018.

Awan et al., "S-Caffe: Co-designing MPI Runtimes and Caffe for Scalable Deep Learning on Modem GPU Clusters," PPoPP '17, Feb. 4-8, 2017, Austin, Texas, USA, pp. 193-205.

* cited by examiner

METHOD, APPARATUS AND DEVICE FOR UPDATING CONVOLUTIONAL NEURAL NETWORK USING GPU CLUSTER

BACKGROUND

Technical Field

One or more implementations of the present specification relate to the field of image processing technologies, and in particular, to a method, an apparatus, and a device for updating a convolutional neural network by using a GPU cluster.

Description of the Related Art

Image classification is to distinguish between different types of images based on semantic information of the images, and is one of the most important research topics of computer vision. With the development of artificial intelligence, especially deep learning, image classification algorithms have made unprecedented progress. In particular, a convolutional neural network (CNN) enables machines to better recognize images than humans for the first time.

Before the convolutional neural network is used to classify images, a graphics processing unit (GPU) is usually needed to update (also known as "to train") the convolutional neural network based on a large number of training samples. However, in the process of updating the convolutional neural network, much memory of the GPU usually needs to be consumed to store parameters and output results of each layer of network of the convolutional neural network. Take a fully connected (FC) layer as an example. Each node of the FC layer is connected to all the nodes of an upper layer, and is used to combine features extracted before. Therefore, much memory usually needs to be consumed for parameters and an output result corresponding to this layer of network. Therefore, some GPUs with a relatively small memory capacity are usually unable to complete the update to the convolutional neural network.

BRIEF SUMMARY

One or more implementations of the present specification describe a method, an apparatus, and a device for updating a convolutional neural network by using a GPU cluster, so that the convolutional neural network can be updated effectively and accurately.

According to a first aspect, a method for updating a convolutional neural network by using a GPU cluster is provided. The GPU cluster includes a first GPU and several other GPUs, the first GPU has parameters of each layer of front-end network of the convolutional neural network, the first GPU and the other GPUs share parameters of each layer of back-end network of the convolutional neural network, and the method is performed by the first GPU and includes: obtaining a sample with a classification label; performing a first operation corresponding to each layer of front-end network on the sample based on the parameters of each layer of front-end network, to obtain a first operation result of the sample; performing a corresponding second operation on the sample based on the first operation result and the parameters of each layer of back-end network that the first GPU has, to obtain a second operation result; separately sending the first operation result to the other GPUs, so that each other GPU performs a corresponding third operation on the sample based on their parameters of each layer of back-end network and the first operation result; receiving a third operation result obtained after each other GPU performs the corresponding third operation; combining the second operation result and the third operation result to obtain a classification result of the sample; determining a prediction error based on the classification result and the classification label of the sample; and updating the convolutional neural network based on the prediction error.

According to a second aspect, a method for updating a convolutional neural network by using a GPU cluster is provided. The GPU cluster includes a first GPU and several other GPUs, the other GPUs have parameters of each layer of front-end network of the convolutional neural network, the first GPU and the other GPUs share parameters of each layer of back-end network of the convolutional neural network, and the method is performed by any second GPU in the other GPUs and includes: receiving a first operation result, which is sent by the first GPU, of a sample with a classification label; performing a corresponding third operation on the sample based on the first operation result and the parameters of each layer of back-end network that the second GPU has, to obtain a third operation result; and sending the third operation result to the first GPU, so that after obtaining a third operation result sent by each other GPU, the first GPU combines a second operation result and the third operation result of the sample to obtain a classification result of the sample, where the second operation result of the sample is obtained after the first GPU performs a corresponding second operation on the sample based on the first operation result and the parameters of each layer of back-end network that the first GPU has, and the first GPU further determines a prediction error based on the classification result and the classification label of the sample, and updates the convolutional neural network based on the prediction error.

According to a third aspect, a method for classifying images by using a GPU cluster is provided. The GPU cluster includes a first GPU and several other GPUs, the first GPU has parameters of each layer of front-end network of a convolutional neural network, the first GPU and the other GPUs share parameters of each layer of back-end network of the convolutional neural network, and the method is performed by the first GPU and includes: obtaining a to-be-classified image; performing a first operation corresponding to each layer of front-end network on the to-be-classified image based on the parameters of each layer of front-end network, to obtain a first operation result of the to-be-classified image; performing a corresponding second operation on the to-be-classified image based on the first operation result and the parameters of each layer of back-end network that the first GPU has, to obtain a second operation result; separately sending the first operation result to the other GPUs, so that each other GPU performs a corresponding third operation on the to-be-classified image based on their parameters of each layer of back-end network and the first operation result; receiving a third operation result obtained after each other GPU performs the corresponding third operation; and combining the second operation result and the third operation result to obtain a classification result of the to-be-classified image.

According to a fourth aspect, an apparatus for updating a convolutional neural network by using a GPU cluster is provided. The GPU cluster includes a first GPU and several other GPUs, the first GPU has parameters of each layer of front-end network of the convolutional neural network, the first GPU and the other GPUs share parameters of each layer of back-end network of the convolutional neural network, and the apparatus includes: an acquisition unit, configured to obtain a sample with a classification label; a first operation unit, configured to perform a first operation corresponding to each layer of front-end network on the sample obtained by the acquisition unit based on the parameters of each layer of front-end network, to obtain a first operation result of the sample; a second operation unit, configured to perform a corresponding second operation on the sample based on the first operation result and the parameters of each layer of back-end network that the first GPU has, to obtain a second operation result; a sending unit, configured to separately send the first operation result to the other GPUs, so that each other GPU performs a corresponding third operation on the sample based on their parameters of each layer of back-end network and the first operation result; a receiving unit, configured to receive a third operation result obtained after each other GPU performs the corresponding third operation; a combining unit, configured to combine the second operation result and the third operation result to obtain a classification result of the sample; a determining unit, configured to determine a prediction error based on the classification result and the classification label of the sample; and an updating unit, configured to update the convolutional neural network based on the prediction error determined by the determining unit.

According to a fifth aspect, an apparatus for updating a convolutional neural network by using a GPU cluster is provided. The GPU cluster includes a first GPU and several other GPUs, the other GPUs have parameters of each layer of front-end network of the convolutional neural network, the first GPU and the other GPUs share parameters of each layer of back-end network of the convolutional neural network, and the apparatus includes: a receiving unit, configured to receive a first operation result, which is sent by the first GPU, of a sample with a classification label; a third operation unit, configured to perform a corresponding third operation on the sample based on the first operation result received by the receiving unit and the parameters of each layer of back-end network that the second GPU has, to obtain a third operation result; and a sending unit, configured to send the third operation result to the first GPU, so that after obtaining a third operation result sent by each other GPU, the first GPU combines a second operation result and the third operation result of the sample to obtain a classification result of the sample, where the second operation result of the sample is obtained after the first GPU performs a corresponding second operation on the sample based on the first operation result and the parameters of each layer of back-end network that the first GPU has, and the first GPU further determines a prediction error based on the classification result and the classification label of the sample, and updates the convolutional neural network based on the prediction error.

According to a sixth aspect, an apparatus for classifying images by using a GPU cluster is provided. The GPU cluster includes a first GPU and several other GPUs, the first GPU has parameters of each layer of front-end network of a convolutional neural network, the first GPU and the other GPUs share parameters of each layer of back-end network of the convolutional neural network, and the apparatus includes: an acquisition unit, configured to obtain a to-be-classified image; a first operation unit, configured to perform a first operation corresponding to each layer of front-end network on the to-be-classified image obtained by the acquisition unit based on the parameters of each layer of front-end network, to obtain a first operation result of the to-be-classified image; a second operation unit, configured to perform a corresponding second operation on the to-be-classified image based on the first operation result and the parameters of each layer of back-end network that the first GPU has, to obtain a second operation result; a sending unit, configured to separately send the first operation result to the other GPUs, so that each other GPU performs a corresponding third operation on the to-be-classified image based on their parameters of each layer of back-end network and the first operation result; a receiving unit, configured to receive a third operation result obtained after each other GPU performs the corresponding third operation; and a combining unit, configured to combine the second operation result and the third operation result to obtain a classification result of the to-be-classified image.

According to a seventh aspect, a device for updating a convolutional neural network is provided. The device includes a first GPU and several other GPUs, the first GPU has parameters of each layer of front-end network of the convolutional neural network, the first GPU and the other GPUs share parameters of each layer of back-end network of the convolutional neural network, and the first GPU implements the following steps when running: obtaining a sample with a classification label; performing a first operation corresponding to each layer of front-end network on the sample based on the parameters of each layer of front-end network, to obtain a first operation result of the sample; performing a corresponding second operation on the sample based on the first operation result and the parameters of each layer of back-end network that the first GPU has, to obtain a second operation result; separately sending the first operation result to the other GPUs, so that each other GPU performs a corresponding third operation on the sample based on their parameters of each layer of back-end network and the first operation result; receiving a third operation result obtained after each other GPU performs the corresponding third operation; combining the second operation result and the third operation result to obtain a classification result of the sample; determining a prediction error based on the classification result and the classification label of the sample; and updating the convolutional neural network based on the prediction error.

According to an eighth aspect, a device for updating a convolutional neural network is provided. The device includes a first GPU and several other GPUs, the other GPUs have parameters of each layer of front-end network of the convolutional neural network, the first GPU and the other GPUs share parameters of each layer of back-end network of the convolutional neural network, and any second GPU in the other GPUs implements the following steps when running: receiving a first operation result, which is sent by the first GPU, of a sample with a classification label; performing a corresponding third operation on the sample based on the first operation result and the parameters of each layer of back-end network that the second GPU has, to obtain a third operation result; and sending the third operation result to the first GPU, so that after obtaining a third operation result sent by each other GPU, the first GPU combines a second operation result and the third operation result of the sample to obtain a classification result of the sample, where the second operation result of the sample is obtained after the first GPU performs a corresponding second operation on the sample based on the first operation result and the parameters of each layer of back-end network that the first GPU has, and the first GPU further determines a prediction error based on the classification result and the classification label of the sample, and updates the convolutional neural network based on the prediction error.

According to a ninth aspect, an image classification device is provided. The device includes a first GPU and several other GPUs, the first GPU has parameters of each layer of front-end network of a convolutional neural network, the first GPU and the other GPUs share parameters of each layer of back-end network of the convolutional neural network, and the first GPU implements the following steps when running: obtaining a to-be-classified image; performing a first operation corresponding to each layer of front-end network on the to-be-classified image based on the parameters of each layer of front-end network, to obtain a first operation result of the to-be-classified image; performing a corresponding second operation on the to-be-classified image based on the first operation result and the parameters of each layer of back-end network that the first GPU has, to obtain a second operation result; separately sending the first operation result to the other GPUs, so that each other GPU performs a corresponding third operation on the to-be-classified image based on their parameters of each layer of back-end network and the first operation result; receiving a third operation result obtained after each other GPU performs the corresponding third operation; and combining the second operation result and the third operation result to obtain a classification result of the to-be-classified image.

One or more implementations of the present specification provide a method, an apparatus, and a device for updating a convolutional neural network by using a GPU cluster. A first GPU obtains a sample with a classification label, performs a first operation on the sample based on parameters of each layer of front-end network, to obtain a first operation result, performs a second operation on the sample based on the first operation result and the parameters of each layer of back-end network that the first GPU has, to obtain a second operation result, separately sends the first operation result to other GPUs, receives a third operation result obtained after each other GPU performs a third operation on the sample based on their parameters of each layer of back-end network and the first operation result, combines the second operation result and the third operation result to obtain a classification result, determines a prediction error based on the classification result and the classification label, and updates the convolutional neural network based on the prediction error. It can be learned that, according to the solutions provided in the present specification, the convolutional neural network can be updated based on multiple GPUs, so that the convolutional neural network can be updated effectively and accurately.

BRIEF DESCRIPTION OF DRAWINGS

To describe the technical solutions in the implementations of the present specification more clearly, the following is a brief introduction of the accompanying drawings for illustrating such implementations. Clearly, the accompanying drawings described below are merely some implementations of the present specification, and a person of ordinary skill in the art can derive other drawings from such accompanying drawings without making innovative efforts.

DETAILED DESCRIPTION

Figure 1:
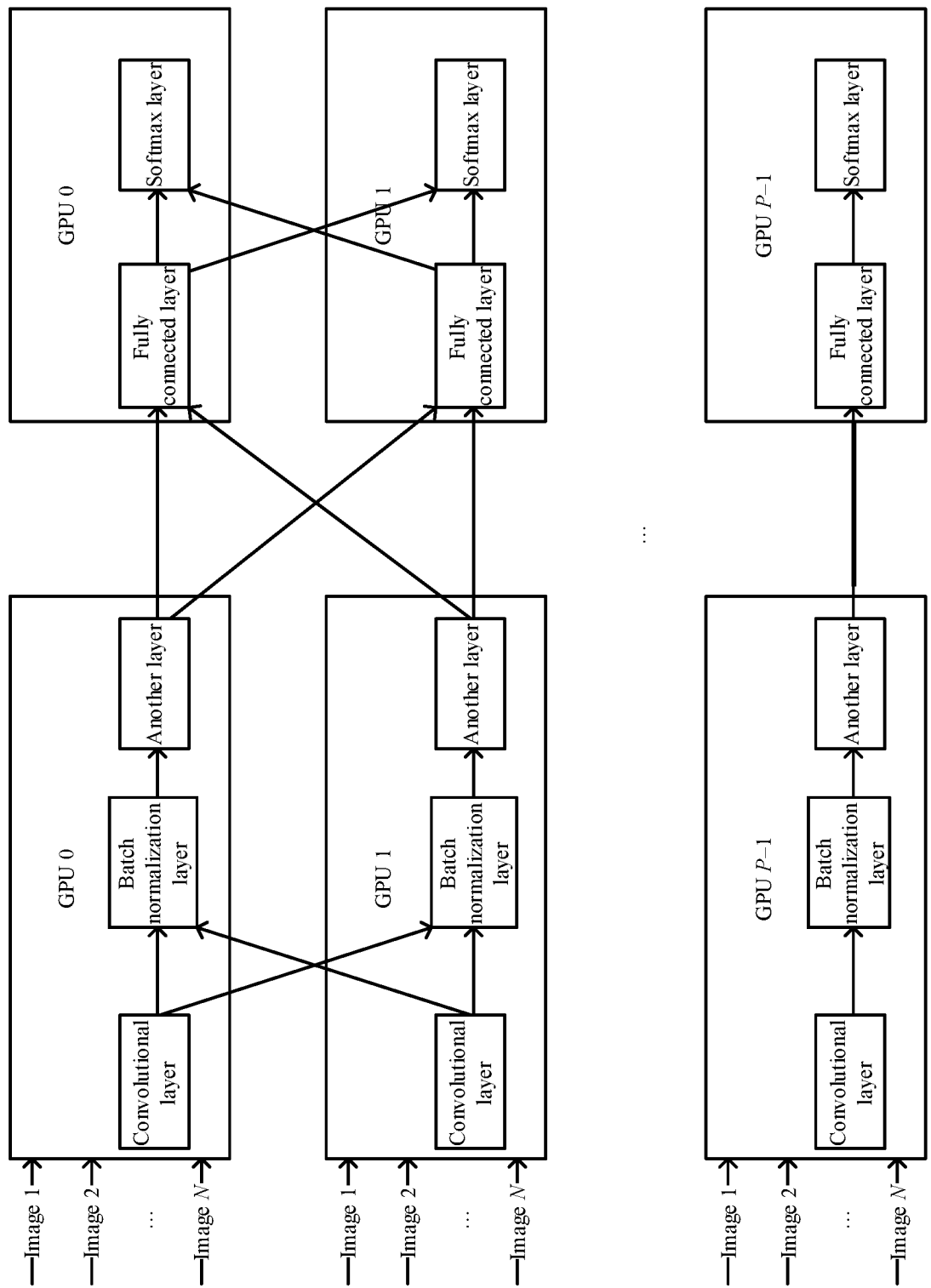
FIG. 1 is a schematic diagram illustrating a method for updating a convolutional neural network by using a GPU cluster according to the present specification.

The following describes the solutions provided in the present specification with reference to the accompanying drawings.

Before description of the solutions provided in the present specification, the following first describes the inventive concept of the solutions.

It can be learned from content of the background that, in the field of image processing technologies, typical image classification methods are based on convolutional neural networks. Convolutional neural networks of AlexNet, Inception, VGG, and ResNet have excellent performance. It has been found that these convolutional neural networks basically use a softmax layer for output of the final classification. An input layer of the softmax layer is usually a fully connected (FC) layer or a convolutional (CONV) layer.

If the input layer of the softmax layer is the FC layer, assuming that a size of data input by the FC layer is [N, H, W, I], and a size of output data is [N, O], the total number of parameters of the FC layer is $H*W*I*O$. Herein, H is a height of an image input by the FC layer, W is a width of the image, N is the number of images, I is the number of feature maps input by the FC layer, and O is a size of a feature map output by the FC layer (i.e., the number of classifications at the softmax layer). If the input layer of the softmax layer is the CONV layer, assuming that a size of data input by the CONV layer is [N, H, W, I], a size of output data is [N, O], and a size of a convolution kernel is $K*K$ (herein, K is usually a relatively small odd number such as 1, 3, or 5), the total number of parameters of the CONV layer is $K*K*I*O$. For convenience of discussion, the softmax layer and its input layer FC layer are referred to as an FC-softmax combination, and the softmax layer and its input layer CONV layer are referred to as a Conv-softmax combination.

It is assumed that parameters of each layer of network of a CNN and corresponding output results are stored in a form of bytes. For the FC-softmax combination, $H*W*I*O*B$ bytes are needed to store parameters of the layer, and $N*O*B$ bytes are needed to store an output result of the softmax layer. For the Conv-softmax combination, K*K*I*O*B bytes are needed to store parameters of the layer, and N*O*B bytes are needed to store an output result of the softmax layer. There is a case that a large number of training samples need to be used to train a convolutional neural network. For example, a facial recognition model is usually trained based on a large number of face images. For example, the number of face images may be equal to the total number of to-be-classified people. In other words, O in the above expression is 1 billion. In the case of O=1 billion, when N=1, the FC-softmax combination requires memory of at least 4 (H*W*I+1) GB, and the Conv-softmax combination requires memory of at least 4 (K*K*I+1) GB. Herein, 4 is used to indicate that a stored parameter or an output result is represented as a single-precision floating-point number. Typically, H=W=7, I is 16, 32, 64, 128, 512, 1024, etc. However, memory of a currently mainstream graphics processing unit (GPU) device is only 16 GB, which is far less than the memory needed by the FC-softmax combination or the Conv-softmax combination. In this case, a single GPU is unable to complete the task of training the convolutional neural network.

Therefore, the applicant of the present application considers evenly distributing parameters of the FC-softmax combination or the Conv-softmax combination to multiple GPUs and then completing training by using distributed memory of the multiple GPUs. Herein, the multiple GPUs can also be referred to as a distributed GPU cluster.

In addition, the applicant further considers that parameters corresponding to layers other than the FC-softmax combination and the Conv-softmax combination, for example, a convolutional layer or a pooling layer (hereinafter referred to as each layer of front-end network, for ease of discussion) occupy less memory; therefore, if parameters of each layer of front-end network are evenly distributed to multiple GPUs, the utilization of the GPUs is reduced, and computing resources are wasted. To save computer resources, in the solutions, a mini-batch based data parallel mode is still used to complete training for each layer of front-end network, to be specific, all the parameters of each layer of front-end network are stored in each GPU.

In this case, assuming that the number of GPUs is P, and each GPU receives input of N images, a batch size of whole network training is N*P. Herein, both P and N are positive integers. In each layer of front-end network, at each moment, all the GPUs process N*P images. In each layer of back-end network (e.g., the FC-softmax combination or the Conv-softmax combination), at each moment, all the GPUs process the same image.

It should be noted that, in each layer of front-end network, although P GPUs can run simultaneously in theory, for some layers (e.g., a batch normalization (BN) layer), corresponding operations can be completed based on data in the whole batch. Therefore, the P GPUs usually further need to communicate with each other. In addition, in each layer of back-end network, P GPUs process an image in cooperation, and therefore, the GPUs also need to communicate with each other. In the present specification, the P GPUs can communicate with each other based on an application programming interface function library supporting distributed communication and computing. For example, the function library can be a message passing interface (MPI) library or a Rabit library.

In addition, because all the GPUs need to process each image, one GPU can be specified as a coordinator to coordinate and maintain the whole processing process. The one GPU is also commonly referred to as a GPU with a coordination and/or management function. The GPU can specify an image currently being processed, and is finally responsible for combining classification results of a batch of images for output, etc.

The above is the inventive concept of the solutions, and the solutions can be derived based on the above inventive concept. The following describes the solutions in detail.

FIG. 1 is a schematic diagram illustrating a method for updating a convolutional neural network according to the present specification. In FIG. 1, a distributed GPU cluster can include P GPUs: GPU 0, GPU 1, . . . , and GPU P−1, and GPU 0 is a GPU with a coordination and/or management function. GPU 0 can have, e.g., by storing, accessing, and/or updating, all the parameters of each layer of front-end network of the CNN and a first part of parameters of each layer of back-end network, GPU 1 can have, e.g., by storing, accessing, and/or updating, all the parameters of each layer of front-end network of the CNN and a second part of parameters of each layer of back-end network, etc. For example, a certain layer of back-end network is an FC layer. Assuming that parameters corresponding to the FC layer can form a matrix of n*m, the number of parameters of the layer that each GPU has can be represented as (n*m)/P. In particular, when there are a large number of GPUs, each GPU can initialize only one column or one row of parameters in the matrix, which is not limited in the present specification.

It should be noted that, the P GPUs can independently initialize the parameters of each layer of front-end network, or can uniformly initialize the parameters. If the P GPUs independently initialize the parameters, the P GPUs do not need to communicate with each other. If the P GPUs uniformly initialize the parameters, one GPU (e.g., GPU 0) can broadcast parameters initialized by the GPU to the other GPUs after completing initialization, so that uniform initialization can be completed between the GPUs. Because each GPU stores only some parameters of each layer of back-end network, each GPU can independently complete initialization.

As shown in FIG. 1, each layer of front-end network provided in the present specification can include a convolutional layer, a BN layer, and another layer. The BN layer is located behind the convolutional layer, and is used to perform normalization processing on an intermediate result output by the convolutional layer. The intermediate result is usually normalized based on a batch of samples (i.e., P*N images). Therefore, the GPUs usually need to communicate with each other. Specific communication content is described later. In addition, FIG. 1 further shows that GPUs at an FC layer and a softmax layer usually also need to communicate with each other. Specific communication content is also described later.

Figure 2:
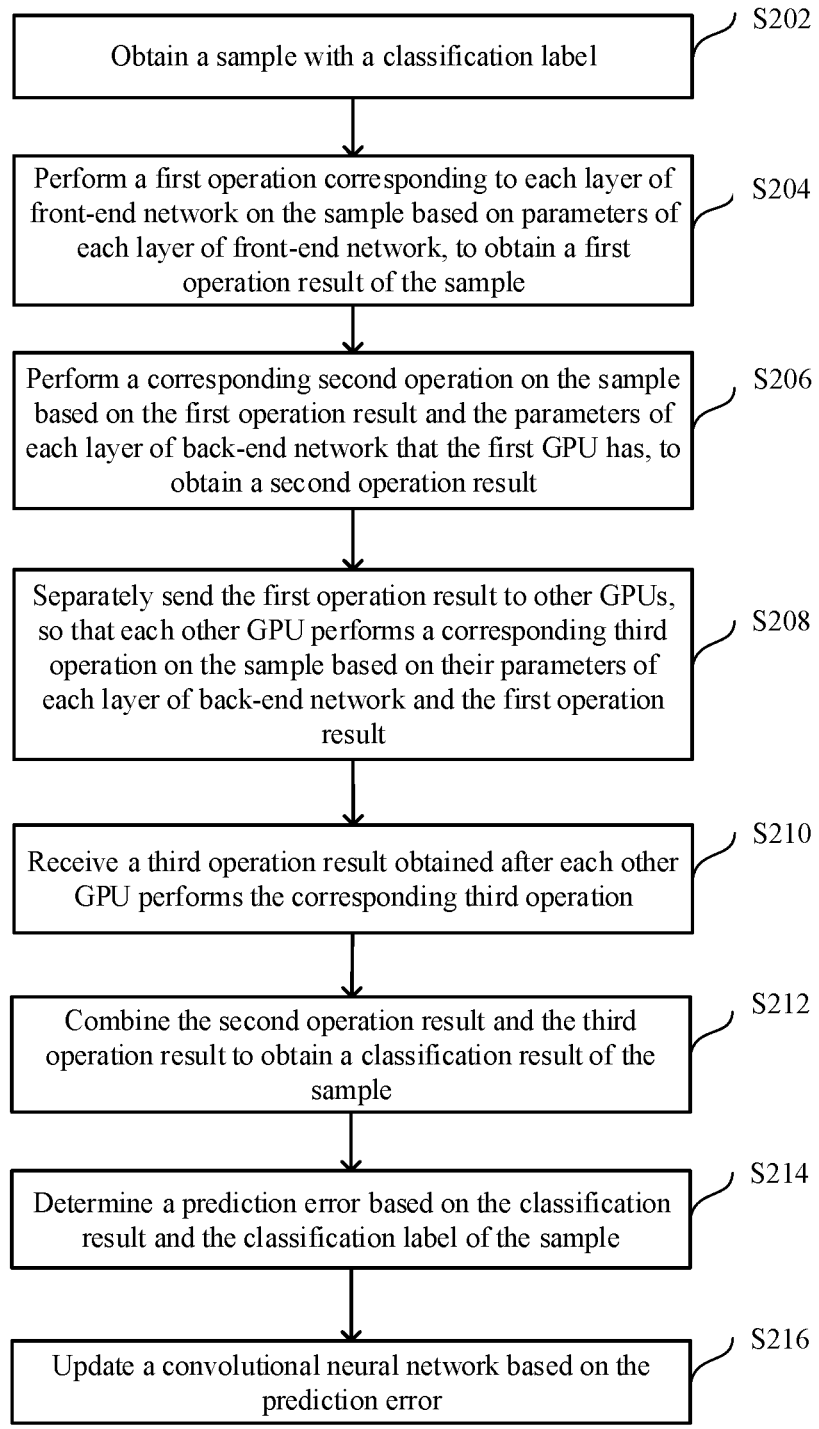
FIG. 2 is a flowchart illustrating a method for updating a convolutional neural network by using a GPU cluster according to an implementation of the present specification.

The above is the overall description of FIG. 1. The following describes in detail a process of updating a convolutional neural network with reference to FIG. 2. In FIG. 2, assuming that the method is performed by GPU 0 (also called a first GPU), i.e., the above GPU with a coordination and management function, the method can include the following steps.

Step 202: Obtain a sample with a classification label.

It should be noted that other GPUs can also obtain other samples corresponding to the GPUs when GPU 0 obtains the sample. Samples obtained by P GPUs form a batch of samples. For example, the sample can be an image, and therefore, the classification label can be a pre-calibrated image type.

Step 204: Perform a first operation corresponding to each layer of front-end network on the sample based on parameters of each layer of front-end network, to obtain a first operation result of the sample.

Similarly, each other GPU can also perform the first operation corresponding to each layer of front-end network on another sample obtained by the GPU based on their parameters of each layer of front-end network, to obtain a first operation result of the another sample.

As described above, each layer of front-end network herein can include a convolutional layer, a BN layer, another layer, etc. For example, a certain layer of network is the convolutional layer. That GPU 0 performs a first operation corresponding to the convolutional layer on the sample based on stored parameters of the convolutional layer can include: GPU 0 performs a convolution operation on the sample based on multiple convolution kernels corresponding to the convolutional layer, to obtain a first intermediate result. Then GPU 0 inputs the first intermediate result to the BN layer. At the BN layer, after obtaining the first intermediate result, GPU 0 can wait for the other GPUs to complete a convolution operation on the other samples obtained by the other GPUs. Then GPU 0 can read second intermediate results obtained after the other GPUs complete a convolution operation on the other samples obtained by the other GPUs. Finally, GPU 0 performs normalization processing on the first intermediate result based on the first intermediate result and the second intermediate results. GPU 0 performs scale transformation and shift on the normalized first intermediate result based on a scale factor and a shift factor corresponding to the BN layer. GPU 0 inputs the first intermediate result obtained after the scale transformation and shift to the another layer, and performs another corresponding operation on the sample based on parameters of the another layer, until the first operation result of the sample is obtained.

The process in which the other GPUs perform the first operation corresponding to each layer of front-end network is similar, and details are omitted herein for simplicity.

It should be noted that, because all the P GPUs have the parameters of each layer of front-end network of the CNN, the P GPUs can simultaneously perform the above first operation on the samples obtained by the P GPUs. In addition, each GPU stores only some parameters of each layer of back-end network of the CNN. Therefore, the P GPUs can jointly perform a second operation and a third operation corresponding to each layer of back-end network on a current sample of which the first operation is completed. The following describes the process of jointly performing operations.

Step 206: Perform the corresponding second operation on the sample based on the first operation result and the parameters of each layer of back-end network that the first GPU has, to obtain a second operation result.

For example, if the sample is an image, the first operation result of the sample can be understood as multiple feature maps extracted by each layer of front-end network from the image. For example, each layer of back-end network is an FC-softmax combination. Assuming that a column of parameters of the FC layer is stored in GPU 0, that GPU 0 performs a second operation corresponding to the FC layer on the image can mean performing the following matrix operation: separately multiplying the extracted multiple feature maps by the column of parameters. Then GPU 0 inputs a matrix operation result to a softmax layer, and performs a second operation corresponding to the softmax layer, to obtain a second operation result of the image.

It can be understood that the second operation corresponding to the softmax layer is a process of further processing the matrix operation result, so that a value of the result ranges from 0 to 1. The further processing process usually involves a matrix operation result corresponding to each column of parameters. Therefore, GPU 0 can further communicate with each other GPU, to obtain a matrix operation result that corresponds to a certain column of parameters and is obtained by each other GPU. In the present specification, the second operation result of the image is a matrix operation result that is obtained after further processing and corresponds to a column of parameters stored in GPU 0.

Step 208: Separately send the first operation result to the other GPUs, so that each other GPU performs the corresponding third operation on the sample based on their parameters of each layer of back-end network and the first operation result.

Continuing with the above example, assuming that another column of parameters of the FC layer are stored in a certain GPU (hereinafter referred to as GPU 1) in the other GPUs, that GPU 1 performs a third operation corresponding to the FC layer on the image can mean performing the following matrix operation: separately multiplying the extracted multiple feature maps by the another column of parameters. Then GPU 1 inputs a matrix operation result to the softmax layer, and performs a third operation corresponding to the softmax layer, to obtain a third operation result of the image corresponding to GPU 1.

Step 210: Receive a third operation result obtained after each other GPU performs the corresponding third operation.

In the above example, GPU 0 can receive matrix operation results of further processing that are separately obtained by the other P−1 GPUs, to obtain P matrix operation results of further processing.

It should be noted that, in the above example, there are P columns of parameters of the FC layers, i.e., the number of columns of a matrix is equal to the number of GPUs, so that parameters of one column of parameters of the FC layer can be stored in each GPU. In practice, the number of GPUs can be arbitrarily set. For example, the number of GPUs can be less than the number of columns of parameters of the FC layer. When the number of GPUs is less than the number of columns of parameters of the FC layer, parameters can be allocated to each GPU by using the following expression: The total number of parameters/P, where P is the number of GPUs. For another example, the number of GPUs can be more than the number of columns of parameters of the FC layer. When the number of GPUs is more than the number of columns of parameters of the FC layer, operation results returned by the remaining GPUs can be empty, i.e., the remaining GPUs do not participate in the operation.

Step 212: Combine the second operation result and the third operation result to obtain a classification result of the sample.

For example, GPU 0 combines the matrix operation results of further processing of the P GPUs, to obtain the classification result.

Step 214: Determine a prediction error based on the classification result and the classification label of the sample.

Certainly, in practice, to improve accuracy of the determined prediction error, the prediction error can be determined based on classification results and classification labels of a batch of samples. In this case, after determining the classification result of the obtained sample, GPU 0 can obtain classification results of the other samples obtained by the other GPUs. GPU 0 combines the classification results of the samples obtained by the P GPUs, to obtain a combined classification result. GPU 0 determines the prediction error based on the combined classification result and classification labels of a batch of samples (including the sample and the other samples).

Certainly, each of P GPUs can obtain multiple samples in practice. A process in which each GPU performs the first operation and the second operation or the third operation on the multiple samples obtained by the GPU is similar, and details are omitted herein for simplicity.

Step 216: Update the convolutional neural network based on the prediction error.

The update process can be specifically as follows: GPU 0 determines first update parameters of each layer of front-end network and second update parameters of each layer of back-end network based on the prediction error. GPU 0 updates the parameters of each layer of front-end network that the first GPU has based on the first update parameters. GPU 0 updates the parameters of each layer of back-end network that the first GPU has based on update parameters in the second update parameters that correspond to the parameters of each layer of back-end network that the first GPU has. GPU 0 sends the first update parameters and corresponding second update parameters to the other GPUs, so that the other GPUs update their parameters of each layer of back-end network based on the corresponding second update parameters.

It should be noted that the reason why GPU 0 can send the corresponding second update parameters to the other GPUs is that in the process of processing a batch of samples, GPU 0 can learn of the parameters of each layer of back-end network that are respectively stored in the other GPUs.

It should be noted that step 206 to step 214 is the process in which the P GPUs jointly perform the second operation or the third operation corresponding to each layer of back-end network on the sample obtained by GPU 0. When the second operation or the third operation is performed on another sample obtained by any one of the other GPUs (hereinafter referred to as a second GPU), step 206 to step 214 can be replaced with the following steps.

Step a: Receive a first operation result of the another sample from the second GPU.

It should be noted that the first operation result herein can be obtained after the second GPU performs the first operation corresponding to each layer of front-end network on the another sample based on the parameters of each layer of front-end network that the second GPU has.

Step b: Perform the corresponding second operation on the another sample based on the first operation result of the another sample and the parameters of each layer of back-end network that the first GPU has, to obtain a second operation result.

To be specific, GPU 0 performs the second operation on another sample received by any second GPU in the other GPUs. It should be noted that the other GPUs can also perform the corresponding third operation on the another sample.

Step c: Receive a third operation result obtained after each other GPU performs the corresponding third operation on the another sample.

After obtaining a third operation result corresponding to the another sample, each GPU other than GPU 0 can send the third operation result of the another sample that is obtained by each other GPU to GPU 0.

Step d: Combine the second operation result of the another sample and the third operation result of the another sample to obtain a classification result of the another sample.

Step e: Determine the prediction error based on the classification result and the classification label of the sample and the classification result and a classification label of the another sample.

To be specific, when further obtaining classification results of other samples, GPU 0 can determine the prediction error based on classification results and classification labels of a batch of samples, so that accuracy of the determined error can be improved.

In conclusion, according to the method for updating a convolutional neural network by using a GPU cluster provided in this implementation of the present specification, the convolutional neural network can be updated based on a large number of training samples, so that accuracy of updating the convolutional neural network can be improved. In addition, multiple GPUs in this implementation of the present specification can simultaneously perform the first operation corresponding to each layer of front-end network on respectively obtained samples, so that utilization of GPU resources can be greatly improved.

The above is the process of updating the convolutional neural network by using GPU 0 (i.e., a coordinator) in the P GPUs as an execution body. The following describes a process of updating a convolutional neural network by using any GPU (hereinafter referred to as a second GPU) other than GPU 0 in the P GPUs as an example.

Figure 3:
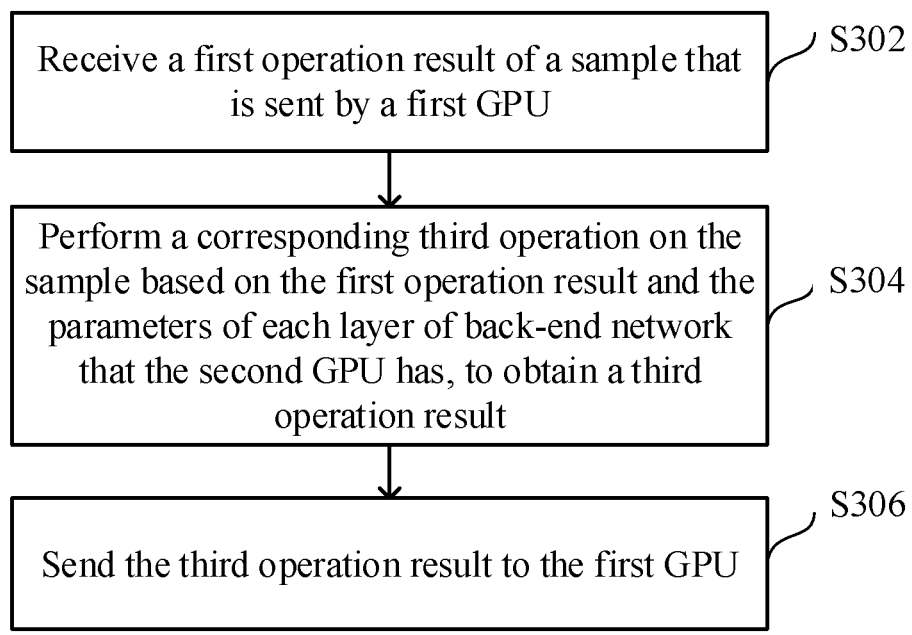
FIG. 3 is a flowchart illustrating a method for updating a convolutional neural network by using a GPU cluster according to another implementation of the present specification.

FIG. 3 is a flowchart illustrating a method for updating a convolutional neural network by using a GPU cluster according to another implementation of the present specification. The method is performed by a second GPU. As shown in FIG. 3, the method can include the following steps.

Step 302: Receive a first operation result of a sample that is sent by a first GPU.

The sample has a classification label.

It can be understood that the first operation result of the same is obtained after the first GPU performs a first operation corresponding to each layer of front-end network on the sample based on the parameters of each layer of front-end network that the first GPU has.

Step 304: Perform a corresponding third operation on the sample based on the first operation result and the parameters of each layer of back-end network that the second GPU has, to obtain a third operation result.

Herein, in the process in which the second GPU performs the third operation, the first GPU can perform a corresponding second operation on the sample, and a GPU other than the second GPU in other GPUs can also perform the corresponding third operation on the sample.

Step 306: Send the third operation result to the first GPU.

After obtaining a third operation result sent by each other GPU, the first GPU combines a second operation result and the third operation result of the sample to obtain a classification result of the sample. The second operation result of the sample herein is obtained after the first GPU performs the corresponding second operation on the sample based on the first operation result and the parameters of each layer of back-end network that the first GPU has. In addition, the first GPU can further determine a prediction error based on the classification result and the classification label of the sample, and updates the convolutional neural network based on the prediction error.

Certainly, in practice, to improve accuracy of the determined prediction error, the prediction error can be determined based on classification results of a batch of samples and corresponding classification labels. A specific determining method is described above, and details are omitted herein for simplicity. In addition, for the process of updating the convolutional neural network, references can also be made to step 216. Details are omitted herein for simplicity.

It should be noted that step 302 to step 306 is a process in which P GPUs jointly perform the second operation or the third operation corresponding to each layer of back-end network on the sample obtained by the first GPU. When the second operation or the third operation is performed on another sample obtained by the second GPU, step 302 to step 306 can be replaced with the following steps.

Step A: Obtain another sample with a classification label.

Step B: Perform the first operation corresponding to each layer of front-end network on the another sample based on the parameters of each layer of front-end network, to obtain a first operation result of the another sample.

As described above, each layer of front-end network herein can include a convolutional layer, a BN layer, another layer, etc. The process of performing the corresponding first operation by the second GPU is similar to that of the first GPU (GPU 0), and details are omitted herein for simplicity.

For example, if the another sample is also an image, the first operation result of the another sample can be understood as multiple feature maps extracted by each layer of front-end network from the image.

Step C: Perform the corresponding third operation on the another sample based on the first operation result of the another sample and the parameters of each layer of back-end network that the second GPU has, to obtain a third operation result.

Step D: Send the first operation result of the another sample to the first GPU and a GPU other than the second GPU in the other GPUs.

The first GPU performs the corresponding second operation on the another sample based on the first operation result of the another sample and the parameters of each layer of back-end network that the first GPU has, to obtain a second operation result. The GPU other than the second GPU in the other GPUs performs the corresponding third operation on the another sample based on the first operation result of the another sample and the parameters of each layer of back-end network that the GPU other than the second GPU has, to obtain a third operation result.

Step E: Send the third operation result of the another sample to the first GPU.

The GPU other than the second GPU in the other GPUs can also send a third operation result to the first GPU. After receiving third operation results sent by the other GPUs, the first GPU combines the second operation result and the third operation results sent by the other GPUs to obtain a classification result of the another sample, and determines the prediction error based on the classification result and the classification label of the sample and the classification result and the classification label of the another sample.

After the prediction error is determined, for the process of updating the convolutional neural network, references can also be made to step 216, and details are omitted herein for simplicity.

In conclusion, according to the method for updating a convolutional neural network by using a GPU cluster provided in this implementation of the present specification, the convolutional neural network can be updated based on a large number of training samples, so that accuracy of updating the convolutional neural network can be improved.

After a convolutional neural network is trained, image classification can be completed in the following way: A first GPU in a distributed GPU cluster performs a first operation corresponding to each layer of front-end network on a to-be-classified image, and then multiple GPUs jointly perform a second operation or a third operation corresponding to each layer of back-end network on the to-be-classified image, to obtain a corresponding classification result. A specific classification process can be shown in FIG. 4.

Figure 4:
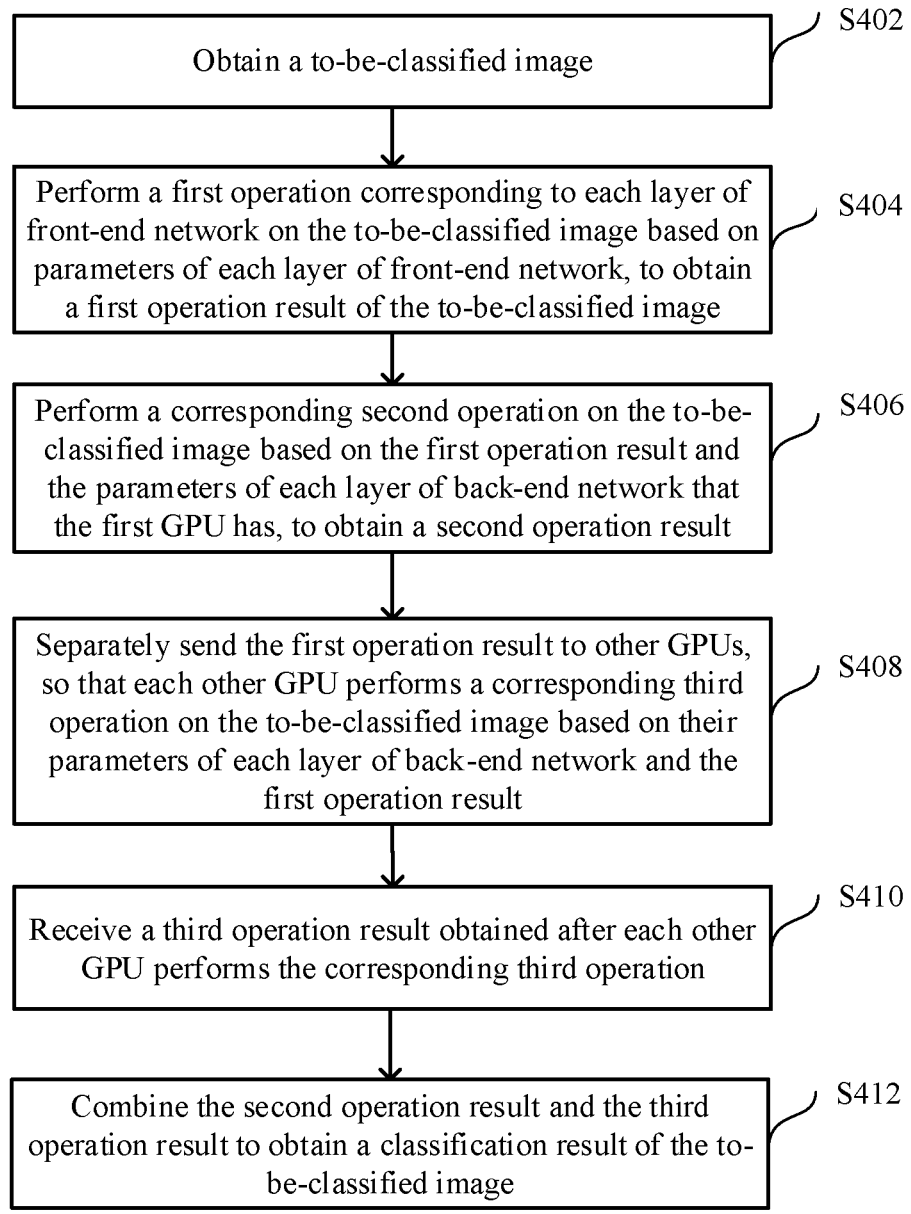
FIG. 4 is a flowchart illustrating a method for classifying images by using a GPU cluster according to the present specification.

FIG. 4 is a flowchart illustrating a method for classifying images by using a GPU cluster according to the present specification. The method can be performed by a first GPU. As shown in FIG. 4, the method can include the following steps:

Step 402: Obtain a to-be-classified image.

Step 404: Perform a first operation corresponding to each layer of front-end network on the to-be-classified image based on parameters of each layer of front-end network, to obtain a first operation result of the to-be-classified image.

Step 406: Perform a corresponding second operation on the to-be-classified image based on the first operation result and the parameters of each layer of back-end network that the first GPU has, to obtain a second operation result.

Step 408: Separately send the first operation result to other GPUs, so that each other GPU performs a corresponding third operation on the to-be-classified image based on their parameters of each layer of back-end network and the first operation result.

Step 410: Receive a third operation result obtained after each other GPU performs the corresponding third operation.

Step 412: Combine the second operation result and the third operation result to obtain a classification result of the to-be-classified image.

In conclusion, according to the method for classifying images by using a GPU cluster provided in this implementation of the present specification, images can be classified accurately and effectively.

Figure 5:
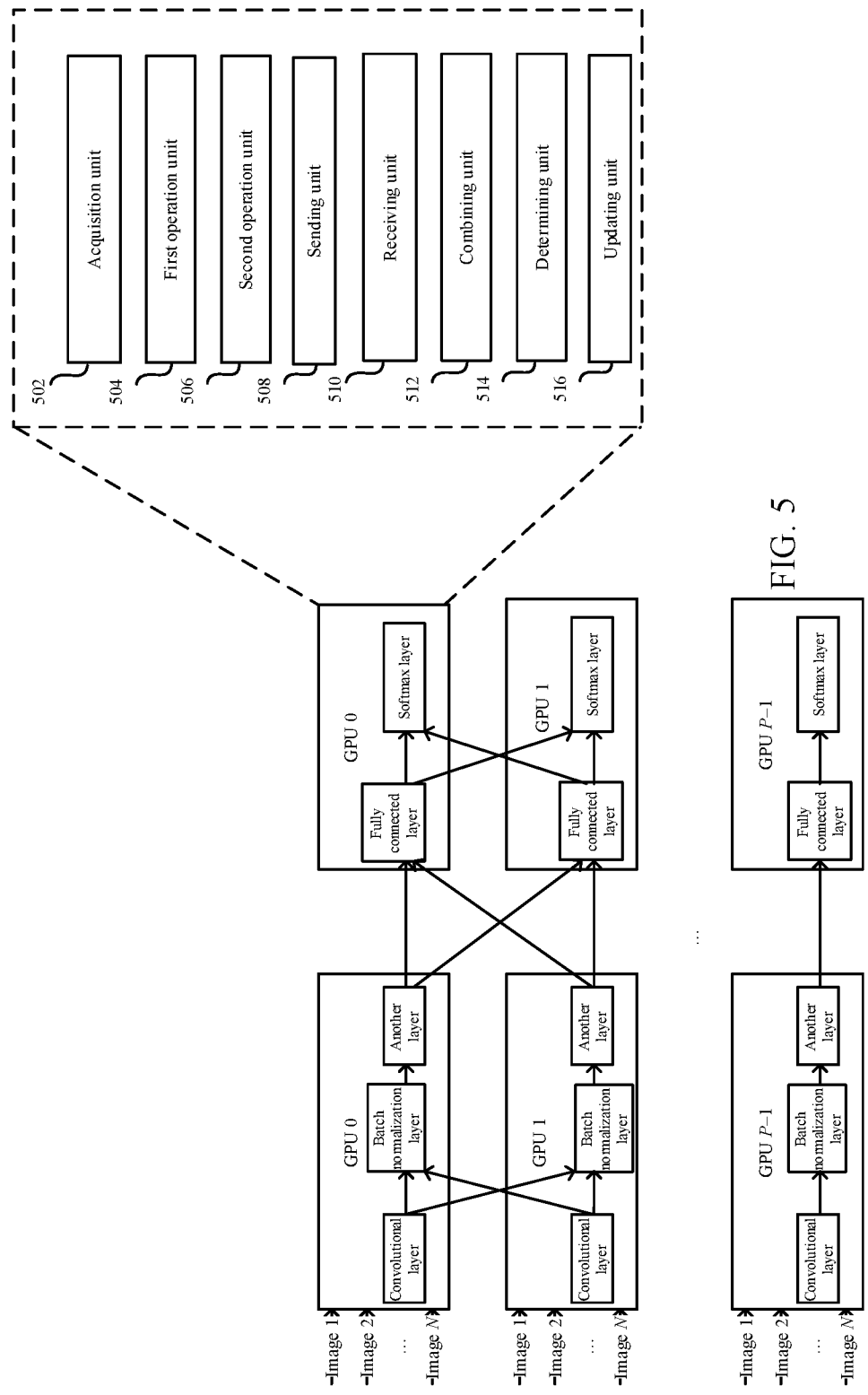
FIG. 5 is a schematic diagram illustrating an apparatus for updating a convolutional neural network by using a GPU cluster according to an implementation of the present specification.

Corresponding to the above method for updating a convolutional neural network by using a GPU cluster, an implementation of the present specification further provides an apparatus for updating a convolutional neural network by using a GPU cluster. The GPU cluster includes a first GPU and several other GPUs, the first GPU has parameters of each layer of front-end network of the convolutional neural network, and the first GPU and the other GPUs share parameters of each layer of back-end network of the convolutional neural network. As shown in FIG. 5, the apparatus can include: an acquisition unit 502, configured to obtain a sample with a classification label; a first operation unit 504, configured to perform a first operation corresponding to each layer of front-end network on the sample obtained by the acquisition unit 502 based on the parameters of each layer of front-end network, to obtain a first operation result of the sample; a second operation unit 506, configured to perform a corresponding second operation on the sample based on the first operation result and the parameters of each layer of back-end network that the first GPU has, to obtain a second operation result; a sending unit 508, configured to separately send the first operation result to the other GPUs, so that each other GPU performs a corresponding third operation on the sample based on their parameters of each layer of back-end network and the first operation result; a receiving unit 510, configured to receive a third operation result obtained after each other GPU performs the corresponding third operation; a combining unit 512, configured to combine the second operation result and the third operation result to obtain a classification result of the sample; a determining unit 514, configured to determine a prediction error based on the classification result and the classification label of the sample; and an updating unit 516, configured to update the convolutional neural network based on the prediction error determined by the determining unit 514.

Optionally, the receiving unit 510 is further configured to receive a first operation result of another sample from a second GPU, where the second GPU is any one of the other GPUs, and the another sample has a classification label.

The second operation unit 506 is further configured to perform the corresponding second operation on the another sample based on the first operation result of the another sample that is received by the receiving unit 510 and the parameters of each layer of back-end network that the first GPU has, to obtain a second operation result.

The receiving unit 510 is further configured to receive a third operation result obtained after each other GPU performs the corresponding third operation on the another sample.

The combining unit 512 is further configured to combine the second operation result of the another sample and the third operation result of the another sample to obtain a classification result of the another sample.

The determining unit 514 is specifically configured to determine the prediction error based on the classification result and the classification label of the sample and the classification result and the classification label of the another sample.

The updating unit 516 can be specifically configured to: determine first update parameters of each layer of front-end network and second update parameters of each layer of back-end network based on the prediction error; update the parameters of each layer of front-end network that the first GPU has based on the first update parameters, and update the parameters of each layer of back-end network that the first GPU has based on update parameters in the second update parameters that correspond to the parameters of each layer of back-end network that the first GPU has; and send the first update parameters and corresponding second update parameters to the other GPUs, so that the other GPUs update their parameters of each layer of back-end network based on the corresponding second update parameters.

Optionally, each layer of front-end network includes a convolutional layer and another layer.

The first operation unit 504 can be specifically configured to: perform a convolution operation on the sample based on parameters of the convolutional layer, to obtain a first intermediate result; obtain second intermediate results that are acquired by the other GPUs performing a convolution operation on other samples obtained by the other GPUs based on parameters of the convolutional layer that the other GPUs have; perform normalization processing on the first intermediate result based on the second intermediate results of the other GPUs; and perform another operation on the sample based on parameters of the another layer and the first intermediate result obtained after normalization processing, to obtain the first operation result of the sample.

Optionally, the first GPU communicates with the other GPUs based on an application programming interface function library supporting distributed communication and computing.

Functions of function modules of the apparatus in the above implementation of the present specification can be implemented by performing the steps in the above method implementation. Therefore, a specific working process of the apparatus provided in this implementation of the present specification is omitted herein for simplicity.

The apparatus for updating a convolutional neural network by using a GPU cluster provided in this implementation of the present specification can update the convolutional neural network based on multiple GPUs, so that the convolutional neural network can be updated effectively and accurately.

The apparatus for updating a convolutional neural network by using a GPU cluster provided in this implementation of the present specification can be a module or a unit in GPU 0 in FIG. 1.

Figure 6:
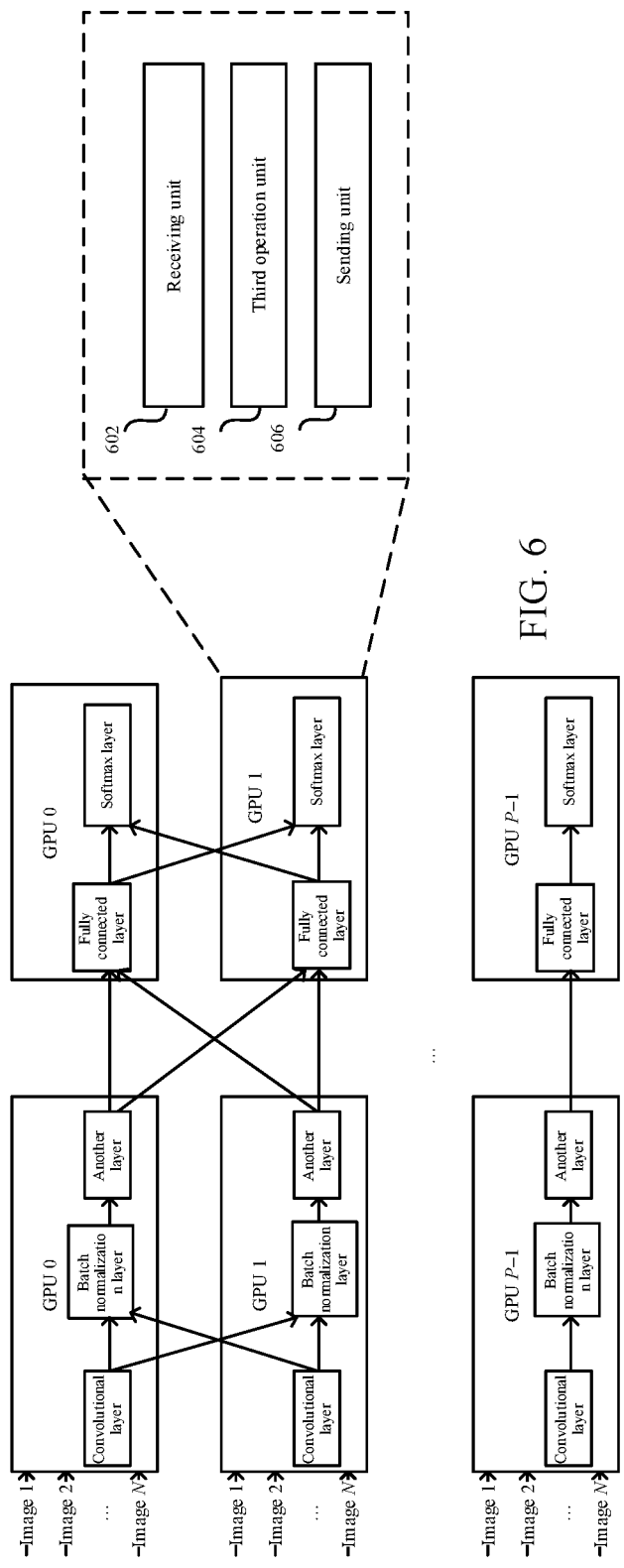
FIG. 6 is a schematic diagram illustrating an apparatus for updating a convolutional neural network by using a GPU cluster according to another implementation of the present specification.

Corresponding to the above method for updating a convolutional neural network by using a GPU cluster, an implementation of the present specification further provides an apparatus for updating a convolutional neural network by using a GPU cluster. The GPU cluster includes a first GPU and several other GPUs, the other GPUs have parameters of each layer of front-end network of the convolutional neural network, and the first GPU and the other GPUs share parameters of each layer of back-end network of the convolutional neural network. As shown in FIG. 6, the apparatus can include: a receiving unit 602, configured to receive a first operation result of a sample that is sent by a first GPU, where the sample has a classification label; a third operation unit 604, configured to perform a corresponding third operation on the sample based on the first operation result received by the receiving unit 602 and the parameters of each layer of back-end network that the second GPU has, to obtain a third operation result; and a sending unit 606, configured to send the third operation result to the first GPU, so that after obtaining a third operation result sent by each other GPU, the first GPU combines a second operation result and the third operation result of the sample to obtain a classification result of the sample, where the second operation result of the sample is obtained after the first GPU performs a corresponding second operation on the sample based on the first operation result and the parameters of each layer of back-end network that the first GPU has, and the first GPU further determines a prediction error based on the classification result and the classification label of the sample, and updates the convolutional neural network based on the prediction error.

Optionally, the apparatus can further include: an acquisition unit, configured to obtain another sample with a classification label; and a first operation unit, configured to perform a first operation corresponding to each layer of front-end network on the another sample based on the parameters of each layer of front-end network, to obtain a first operation result of the another sample.

The third operation unit 604 is further configured to perform the corresponding third operation on the another sample based on the first operation result of the another sample and the parameters of each layer of back-end network that the second GPU has, to obtain a third operation result.

The sending unit 606 is further configured to send the first operation result of the another sample to the first GPU and a GPU other than the second GPU in the other GPUs, so that the first GPU performs the corresponding second operation on the another sample based on the parameters of each layer of back-end network that the first GPU has and the first operation result of the another sample, to obtain a second operation result, and the GPU other than the second GPU in the other GPUs performs the corresponding third operation on the another sample based on the parameters of each layer of back-end network that the GPU other than the second GPU has and the first operation result of the another sample, to obtain a third operation result.

The sending unit 606 is further configured to send the third operation result of the another sample to the first GPU, so that the first GPU combines the second operation result and third operation results sent by the other GPUs, to obtain a classification result of the another sample, and determines the prediction error based on the classification result and the classification label of the sample and the classification result and the classification label of the another sample.

Functions of function modules of the apparatus in the above implementation of the present specification can be implemented by performing the steps in the above method implementation. Therefore, a specific working process of the apparatus provided in this implementation of the present specification is omitted herein for simplicity.

The apparatus for updating a convolutional neural network by using a GPU cluster provided in this implementation of the present specification can update the convolutional neural network based on multiple GPUs, so that the convolutional neural network can be updated effectively and accurately.

The apparatus for updating a convolutional neural network by using a GPU cluster provided in this implementation of the present specification can be a module or a unit in any one of GPU 1 to GPU P−1 in FIG. 1.

Figure 7:
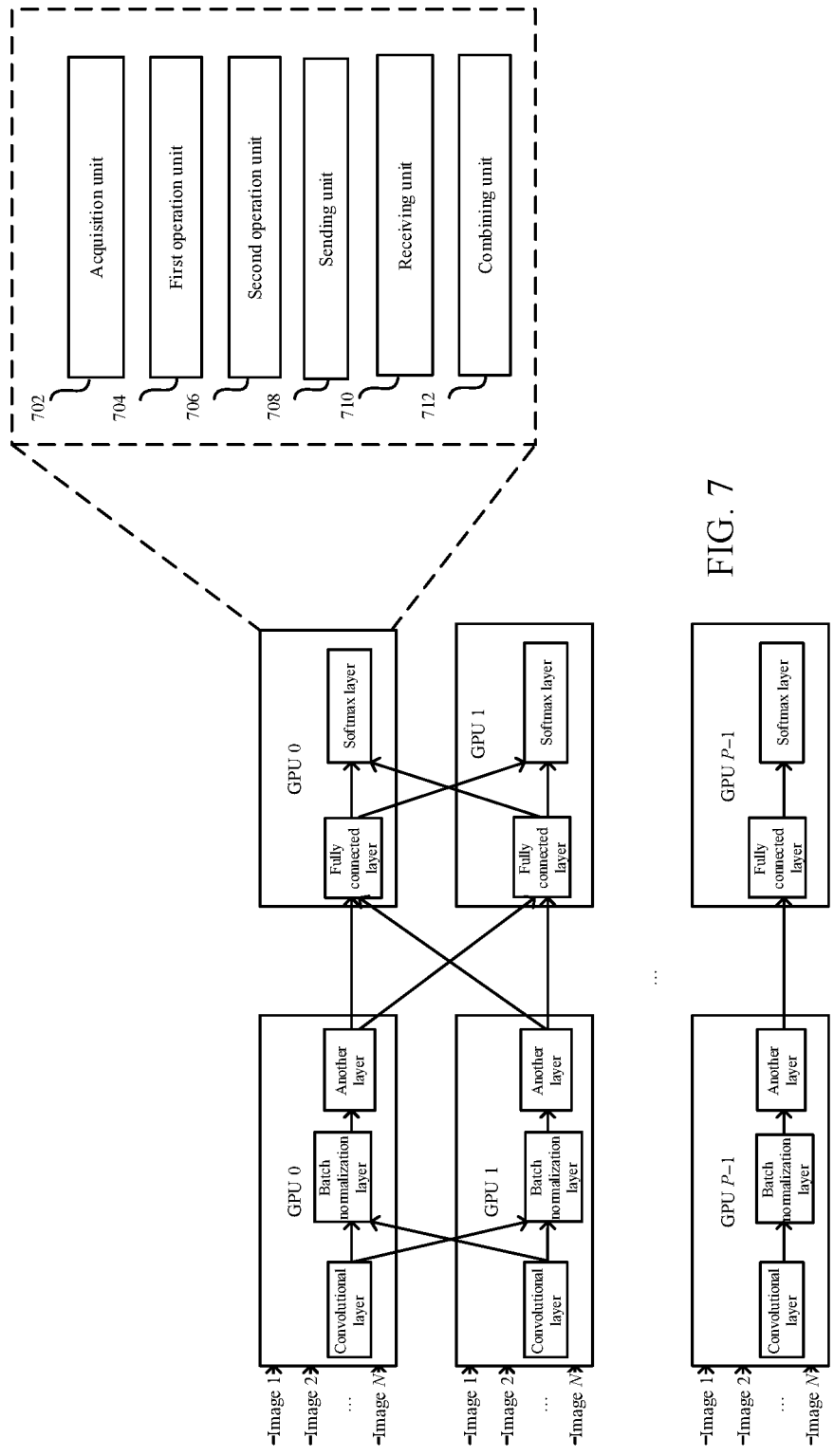
FIG. 7 is a schematic diagram illustrating an apparatus for classifying images by using a GPU cluster according to the present specification.

Corresponding to the above method for classifying images by using a GPU cluster, an implementation of the present specification further provides an apparatus for classifying images by using a GPU cluster. The GPU cluster includes a first GPU and several other GPUs, the first GPU has parameters of each layer of front-end network of a convolutional neural network, and the first GPU and the other GPUs share parameters of each layer of back-end network of the convolutional neural network. As shown in FIG. 7, the apparatus can include: an acquisition unit 702, configured to obtain a to-be-classified image; a first operation unit 704, configured to perform a first operation corresponding to each layer of front-end network on the to-be-classified image obtained by the acquisition unit 702 based on the parameters of each layer of front-end network, to obtain a first operation result of the to-be-classified image; a second operation unit 706, configured to perform a corresponding second operation on the to-be-classified image based on the first operation result and the parameters of each layer of back-end network that the first GPU has, to obtain a second operation result; a sending unit 708, configured to separately send the first operation result to the other GPUs, so that each other GPU performs a corresponding third operation on the to-be-classified image based on their parameters of each layer of back-end network and the first operation result; a receiving unit 710, configured to receive a third operation result obtained after each other GPU performs the corresponding third operation; and a combining unit 712, configured to combine the second operation result and the third operation result to obtain a classification result of the to-be-classified image.

The apparatus for classifying images by using a GPU cluster provided in this implementation of the present specification can classify images accurately and effectively.

The apparatus for classifying images by using a GPU cluster provided in this implementation of the present specification can be a module or a unit in GPU 0 in FIG. 1.

Figure 8:
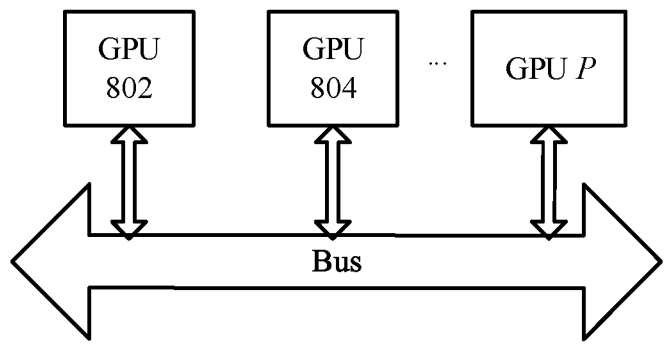
FIG. 8 is a schematic diagram illustrating a device for updating a convolutional neural network according to an implementation of the present specification.

Corresponding to the above method for updating a convolutional neural network by using a GPU cluster, an implementation of the present specification further provides a device for updating a convolutional neural network. As shown in FIG. 8, the device can include a first GPU 802 and several other GPUs (GPU 804 to GPU P), the first GPU 802 has parameters of each layer of front-end network of the convolutional neural network, the first GPU 802 and the other GPUs share parameters of each layer of back-end network of the convolutional neural network, and the first GPU 802 implements the following steps when running: obtaining a sample with a classification label; performing a first operation corresponding to each layer of front-end network on the sample based on the parameters of each layer of front-end network, to obtain a first operation result of the sample; performing a corresponding second operation on the sample based on the first operation result and the parameters of each layer of back-end network that the first GPU has, to obtain a second operation result; separately sending the first operation result to the other GPUs, so that each other GPU performs a corresponding third operation on the sample based on their parameters of each layer of back-end network and the first operation result; receiving a third operation result obtained after each other GPU performs the corresponding third operation; combining the second operation result and the third operation result to obtain a classification result of the sample; determining a prediction error based on the classification result and the classification label of the sample; and updating the convolutional neural network based on the prediction error.

The device for updating a convolutional neural network provided in this implementation of the present specification can update the convolutional neural network based on multiple GPUs, so that the convolutional neural network can be updated effectively and accurately.

Figure 9:
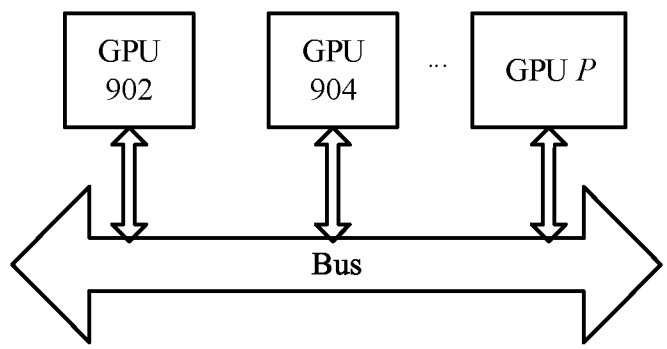
FIG. 9 is a schematic diagram illustrating a device for updating a convolutional neural network according to another implementation of the present specification.

Corresponding to the above method for updating a convolutional neural network by using a GPU cluster, an implementation of the present specification further provides a device for updating a convolutional neural network. As shown in FIG. 9, the device can include a first GPU 902 and several other GPUs (GPU 904 to GPU P), the other GPUs have parameters of each layer of front-end network of the convolutional neural network, the first GPU and the other GPUs share parameters of each layer of back-end network of the convolutional neural network, and any second GPU 904 in the other GPUs implements the following steps when running: receiving a first operation result, which is sent by the first GPU, of a sample with a classification label; performing a corresponding third operation on the sample based on the first operation result and the parameters of each layer of back-end network that the second GPU has, to obtain a third operation result; and sending the third operation result to the first GPU, so that after obtaining a third operation result sent by each other GPU, the first GPU combines a second operation result and the third operation result of the sample to obtain a classification result of the sample, where the second operation result of the sample is obtained after the first GPU performs a corresponding second operation on the sample based on the first operation result and the parameters of each layer of back-end network that the first GPU has, and the first GPU further determines a prediction error based on the classification result and the classification label of the sample, and updates the convolutional neural network based on the prediction error.

The device for updating a convolutional neural network provided in this implementation of the present specification can update the convolutional neural network based on multiple GPUs, so that the convolutional neural network can be updated effectively and accurately.

Figure 10:
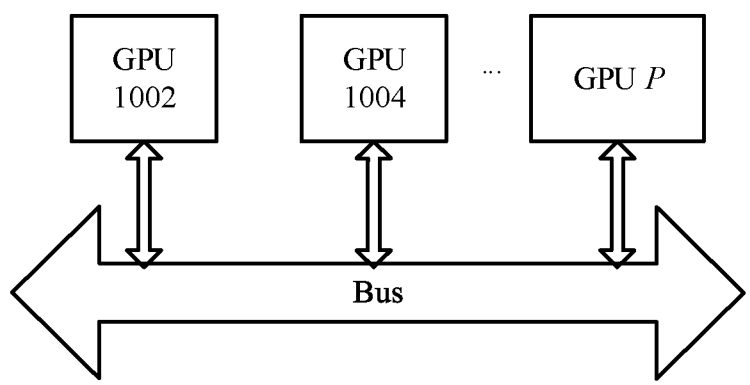
FIG. 10 is a schematic diagram illustrating an image classification device according to the present specification.

Corresponding to the above method for classifying images by using a GPU cluster, the present specification further provides an image classification device. As shown in FIG. 10, the device can include a first GPU 1002 and several other GPUs (GPU 1004 to GPU P), the first GPU 1002 has parameters of each layer of front-end network of a convolutional neural network, the first GPU 1002 and the other GPUs share parameters of each layer of back-end network of the convolutional neural network, and the first GPU 1002 implements the following steps when running: obtaining a to-be-classified image; performing a first operation corresponding to each layer of front-end network on the to-be-classified image based on the parameters of each layer of front-end network, to obtain a first operation result of the to-be-classified image; performing a corresponding second operation on the to-be-classified image based on the first operation result and the parameters of each layer of back-end network that the first GPU has, to obtain a second operation result; separately sending the first operation result to the other GPUs, so that each other GPU performs a corresponding third operation on the to-be-classified image based on their parameters of each layer of back-end network and the first operation result; receiving a third operation result obtained after each other GPU performs the corresponding third operation; and combining the second operation result and the third operation result to obtain a classification result of the to-be-classified image.

The image classification device provided in the present specification can classify images accurately and effectively.

The implementations of the present specification are described in a progressive way. For same or similar parts of the implementations, references can be made to the implementations. Each implementation focuses on a difference from other implementations. Particularly, device implementations are basically similar to method implementations, and therefore, are described briefly. For related parts, references can be made to parts of the method implementation descriptions.

Steps of methods or algorithms described with reference to the content disclosed in the present specification can be implemented by hardware or can be implemented by a processor executing a software instruction. The software instruction can include a corresponding software module, and the software module can be stored in a RAM memory, a flash memory, a ROM memory, an EPROM memory, an EEPROM memory, a register, a hard disk drive, a removable hard disk, a CD-ROM, or any other form of storage medium known in the art. An example storage medium is coupled to a processor, so that the processor can read information from the storage medium and can write information to the storage medium. Certainly, the storage medium can be an integral part of the processor. The processor and the storage medium can be located in an ASIC. In addition, the ASIC can be located in a server. Certainly, the processor and the storage medium can exist in the server as discrete components.

A person skilled in the art should be aware that in the above one or more examples, functions described in the present disclosure can be implemented by hardware, software, firmware, or any combination thereof. When the present disclosure is implemented by software, the functions can be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium can be any available medium accessible to a general-purpose or dedicated computer.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

The objectives, technical solutions, and benefits of the present specification are further described in detail in the above specific implementations. It should be understood that the above descriptions are merely specific implementations of the present specification, but are not intended to limit the protection scope of the present specification. Any modification, equivalent replacement, or improvement made on the basis of the technical solutions of the present specification shall fall within the protection scope of the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for updating a convolutional neural network by using a graphics processing unit (GPU) cluster, the GPU cluster including a first GPU and a plurality of other GPUs, wherein the method is performed by the first GPU and comprises:

obtaining a sample with a classification label;

performing a first operation corresponding to each layer of a front-end network of the convolutional neural network on the sample based on the parameters of each layer of the front-end network, to obtain a first operation result of the sample, wherein the front-end network includes at least one of a convolutional layer or pooling layer and wherein the first GPU and the other GPUs each stores a complete set of parameters of each layer of the front-end network;

performing a corresponding second operation on the sample based on the first operation result and a subset of parameters of each layer of a back-end network of the convolutional neural network that the first GPU stores, to obtain a second operation result, wherein the back-end network includes a convolutional-softmax (Conv-softmax) combination and wherein the parameters of each layer of the back-end network are distributed into different subsets and each of the subsets is stored in a respective GPU among the first GPU and the other GPUs;

separately sending the first operation result to the other GPUs, so that each other GPU performs a corresponding third operation on the sample based on their respective subset of the parameters of each layer of the back-end network and the first operation result;

receiving a third operation result obtained after each other GPU performs the corresponding third operation;
combining the second operation result and the third operation result to obtain a classification result of the sample;
determining a prediction error based on the classification result and the classification label of the sample; and
updating the convolutional neural network based on the prediction error.

2. The method according to claim 1, further comprising:
receiving a first operation result of another sample from a second GPU, wherein the second GPU is any one of the other GPUs, and the another sample has a classification label;
performing the corresponding second operation on the another sample based on the first operation result of the another sample and the subset of the parameters of each layer of the back-end network that the first GPU stores, to obtain a second operation result;
receiving a third operation result obtained after each other GPU performs the corresponding third operation on the another sample; and
combining the second operation result of the another sample and the third operation result of the another sample to obtain a classification result of the another sample, wherein
determining the prediction error includes: determining the prediction error based on (a) the classification result and the classification label of the sample and (b) the classification result and the classification label of the another sample.

3. The method according to claim 1, wherein updating the convolutional neural network based on the prediction error includes:
determining first update parameters of each layer of the front-end network and second update parameters of each layer of the back-end network based on the prediction error;
updating the parameters of each layer of the front-end network that the first GPU stores based on the first update parameters;
updating the subset of the parameters of each layer of the back-end network that the first GPU stores based on a subset of the second update parameters that correspond to the subset of the parameters of each layer of the back-end network that the first GPU stores; and
sending the first update parameters and a corresponding subset of second update parameters to each other GPU, so that each other GPU updates its respective subset of the parameters of each layer of the back-end network based on the corresponding subset of the second update parameters.

4. The method according to claim 1, wherein the front-end network includes a convolutional layer and another layer; and
performing the first operation corresponding to each layer of front-end network on the sample based on the parameters of each layer of the front-end network, to obtain the first operation result of the sample includes:
performing a convolution operation on the sample based on parameters of the convolutional layer, to obtain a first intermediate result;
obtaining second intermediate results that are produced by the other GPUs performing a convolution operation on other samples based on parameters of the convolutional layer that the other GPUs store;
performing normalization processing on the first intermediate result based on the second intermediate results; and
performing another operation on the sample based on parameters of the another layer and the first intermediate result obtained after the normalization processing, to obtain the first operation result of the sample.

5. The method according to claim 1, wherein the first GPU communicates with the other GPUs based on an application programming interface function library supporting distributed communication and computing.

6. A method for updating a convolutional neural network by using a graphics processing unit (GPU) cluster, the GPU cluster including a first GPU and a plurality of other GPUs, wherein the method is performed by a second GPU of the other GPUs and comprises:
receiving a first operation result, sent by the first GPU, of a sample with a classification label, wherein a front-end network of the convolutional neural network includes at least one of a convolutional layer or pooling layer and wherein the first GPU and the other GPUs each stores a complete set of parameters of each layer of the front-end network;
performing a corresponding third operation on the sample based on the first operation result and a subset of parameters of each layer of a back-end network of the convolutional neural network that the second GPU stores, to obtain a third operation result, wherein the back-end network includes a convolutional-softmax (Conv-softmax) combination and wherein the parameters of each layer of the back-end network are distributed into different subsets and each of the subsets is stored in a respective GPU among the first GPU and the other GPUs; and
sending the third operation result to the first GPU, so that after obtaining a third operation result sent by each other GPU, the first GPU combines a second operation result and the third operation result of the sample to obtain a classification result of the sample, wherein the second operation result of the sample is obtained after the first GPU performs a corresponding second operation on the sample based on the first operation result and a subset of the parameters of each layer of the back-end network that the first GPU stores, and the first GPU further determines a prediction error based on the classification result and the classification label of the sample, and updates the convolutional neural network based on the prediction error.

7. The method according to claim 6, further comprising:
obtaining another sample with a classification label;
performing a first operation corresponding to each layer of the front-end network on the another sample based on the parameters of each layer of front-end network, to obtain a first operation result of the another sample, and performing the corresponding third operation on the another sample based on the first operation result of the another sample and the subset of the parameters of each layer of the back-end network that the second GPU stores, to obtain a third operation result;
sending the first operation result of the another sample to the first GPU and a third GPU of the other GPUs, so that the first GPU performs the corresponding second operation on the another sample based on the subset of the parameters of each layer of the back-end network that the first GPU stores and the first operation result of the another sample, to obtain a second operation result, and the third GPU performs the corresponding third operation on the another sample based on a subset of the parameters of each layer of the back-end network that the third GPU stores and the first operation result of the another sample, to obtain a third operation result; and sending the third operation result of the another sample to the first GPU, so that the first GPU combines the second operation result and third operation results sent by the other GPUs, to obtain a classification result of the another sample, and determines the prediction error based on the classification result and the classification label of the sample and the classification result and the classification label of the another sample.

8. A method for classifying images by using a graphics processing unit (GPU) cluster, the GPU cluster including a first GPU and a plurality of other GPUs, wherein the method is performed by the first GPU and comprises:

obtaining a to-be-classified image;

performing a first operation corresponding to each layer of a front-end network on the to-be-classified image based on the parameters of each layer of the front-end network, to obtain a first operation result of the to-be-classified image, wherein the front-end network is part of a convolutional neural network and includes at least one of a convolutional layer or pooling layer and wherein the first GPU and the other GPUs each stores a complete set of parameters of each layer of the front-end network;

performing a corresponding second operation on the to-be-classified image based on the first operation result and a subset of parameters of each layer of a back-end network that the first GPU stores, to obtain a second operation result, wherein the back-end network is part of the convolutional neural network and includes a convolutional-softmax (Conv-softmax) combination and wherein the parameters of each layer of the back-end network are distributed into different subsets and each of the subsets is stored in a respective GPU among the first GPU and the other GPUs;

separately sending the first operation result to the other GPUs, so that each other GPU performs a corresponding third operation on the to-be-classified image based on their respective subset of the parameters of each layer of the back-end network and the first operation result;

receiving a third operation result obtained after each other GPU performs the corresponding third operation; and combining the second operation result and the third operation result to obtain a classification result of the to-be-classified image.

9. An apparatus for updating a convolutional neural network by using a graphics processing unit (GPU) cluster, the GPU cluster including a first GPU and a plurality of second GPUs, where the apparatus comprises:

an acquisition unit, configured to obtain a sample with a classification label;

a first operation unit, configured to perform a first operation corresponding to each layer of a front-end network on the sample obtained by the acquisition unit based on parameters of each layer of the front-end network, to obtain a first operation result of the sample, wherein the front-end network is part of the convolutional neural network and includes at least one of a convolutional layer or pooling layer and wherein the first GPU and the other GPUs each stores a complete set of parameters of each layer of the front-end network;

a second operation unit, configured to perform a corresponding second operation on the sample based on the first operation result and a subset of parameters of each layer of a back-end network that the first GPU stores, to obtain a second operation result, wherein the back-end network is part of the convolutional neural network and includes a convolutional-softmax (Cony-softmax) combination and wherein the parameters of each layer of the back-end network are distributed into different subsets and each of the subsets is stored in a respective GPU among the first GPU and the other GPUs;

a sending unit, configured to separately send the first operation result to the second GPUs, so that each second GPU performs a corresponding third operation on the sample based on their respective subset of the parameters of each layer of the back-end network and the first operation result;

a receiving unit, configured to receive a third operation result obtained after each other GPU performs the corresponding third operation;

a combining unit, configured to combine the second operation result and the third operation result to obtain a classification result of the sample;

a determining unit, configured to determine a prediction error based on the classification result and the classification label of the sample; and an updating unit, configured to update the convolutional neural network based on the prediction error determined by the determining unit.

10. The apparatus according to claim 9, wherein the receiving unit is further configured to receive a first operation result of another sample from a second GPU, wherein the another sample has a classification label;

the second operation unit is further configured to perform a corresponding second operation on the another sample based on the first operation result of the another sample that is received by the receiving unit and the subset of the parameters of each layer of the back-end network that the first GPU stores, to obtain a second operation result;

the receiving unit is further configured to receive a third operation result obtained after each other GPU performs a corresponding third operation on the another sample;

the combining unit is further configured to combine the second operation result of the another sample and the third operation result of the another sample to obtain a classification result of the another sample; and the determining unit is specifically configured to determine the prediction error based on (a) the classification result and the classification label of the sample and (b) the classification result and the classification label of the another sample.

11. The apparatus according to claim 9, wherein the updating unit is specifically configured to:

determine first update parameters of each layer of the front-end network and second update parameters of each layer of the back-end network based on the prediction error;

update the parameters of each layer of the front-end network that the first GPU stores based on the first update parameters;

update the subset of the parameters of each layer of the back-end network that the first GPU stores based on a subset of the second update parameters that correspond to the subset of the parameters of each layer of the back-end network that the first GPU stores; and send the first update parameters and a corresponding subset of the second update parameters to each second GPUs, so that each second GPU updates its respective subset of the parameters of each layer of the back-end network based on the corresponding subset of the second update parameters.

12. The apparatus according to claim 9, wherein the front-end network includes a convolutional layer and another layer; and the first operation unit is specifically configured to:
  perform a convolution operation on the sample based on parameters of the convolutional layer, to obtain a first intermediate result;
  obtain second intermediate results that are produced by the second GPUs performing a convolution operation on other samples based on parameters of the convolutional layer that the other GPUs store;
  perform normalization processing on the first intermediate result based on the second intermediate results; and
  perform another operation on the sample based on parameters of the another layer and the first intermediate result obtained after the normalization processing, to obtain the first operation result of the sample.

13. The apparatus according to claim 9, wherein the first GPU communicates with the second GPUs based on an application programming interface function library supporting distributed communication and computing.

\* \* \* \* \*